UNITED STATES PATENT OFFICE.

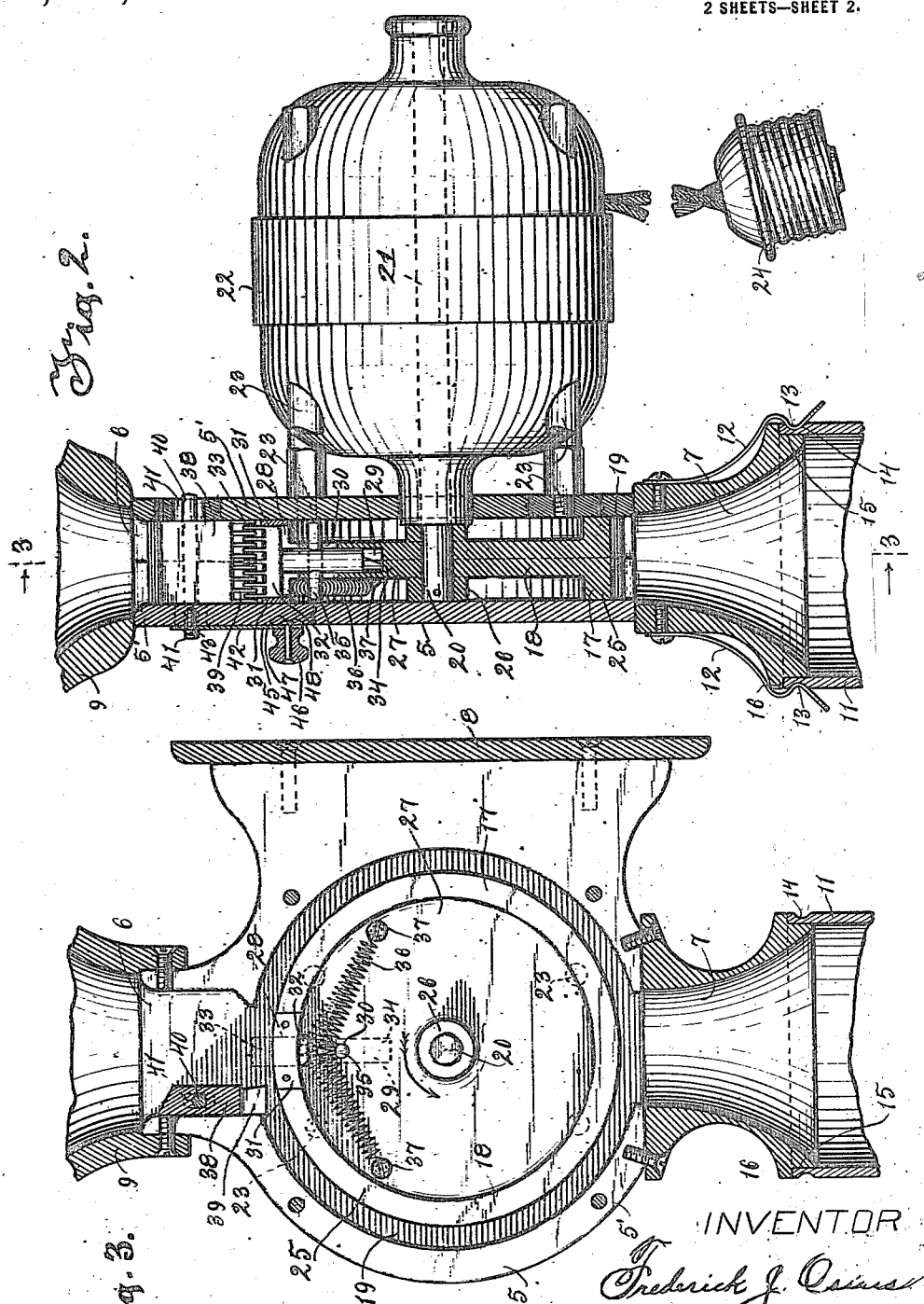

FREDERICK J. OSIUS, OF RACINE, WISCONSIN.

CUTTING-MILL.

1,215,055. Specification of Letters Patent. Patented Feb. 6, 1917.

Application filed March 25, 1916. Serial No. 86,536.

*To all whom it may concern:*

Be it known that I, FREDERICK J. OSIUS, a citizen of the United States, and resident of Racine, in the county of Racine and State of Wisconsin, have invented new and useful Improvements in Cutting-Mills, of which the following is a description, reference being had to the accompanying drawings, which are a part of this specification.

This invention relates to a means for cutting, grinding, comminuting, triturating or reducing substances to a relatively fine condition, which will require but a fraction of the power now ordinarily used, and which may be efficiently actuated by an electric motor of comparatively small size and power.

It is one of the objects of the present invention to provide a cutting mill which is more particularly adapted for reducing coffee to a relatively fine condition by a cutting process.

A further object of the invention is to provide a cutting mill which will not start to cut until the rotary member is revolved at a comparatively high velocity.

A further object of the invention is to provide a cutting mill in which the rotary cutting member is provided with a cutting means which is moved to a cutting position by centrifugal force when the cutting member is rotated at a predetermined velocity.

A further object of the invention is to provide a cutting mill which will cut coffee beans into clean cut particles expeditiously and without impairing the flavor of the coffee by heating the same as in the ordinary grinding process.

A further object of the invention is to provide a cutting mill having a rotary and a stationary cutting member in which the stationary cutting member is adjustable to regulate the degree of fineness the coffee beans are cut.

A further object of the invention is to provide a cutting mill in which the coffee beans will be automatically fed to the cutting means without the liability of overfeeding and stopping the machine.

A further object of the invention is to provide a cutting mill which is adapted for household use and which may be actuated by connection with one of the sockets of the electric light fixtures of the house.

A further object of the invention is to provide a cutting mill which is of simple construction and efficient in operation, is strong and durable and is well adapted for the purpose described.

With the above and other objects in view the invention consists of the improved cutting mill and its parts and combinations as set forth in the claims, and all equivalents thereof.

In the accompanying drawings in which the same reference characters indicate the same parts in all of the views:

Fig. 2 is a vertical sectional view thereof taken on line 2—2 of Fig. 1; and

Fig. 3 is a vertical sectional view taken on line 3—3 of Fig. 2.

Figure 1:
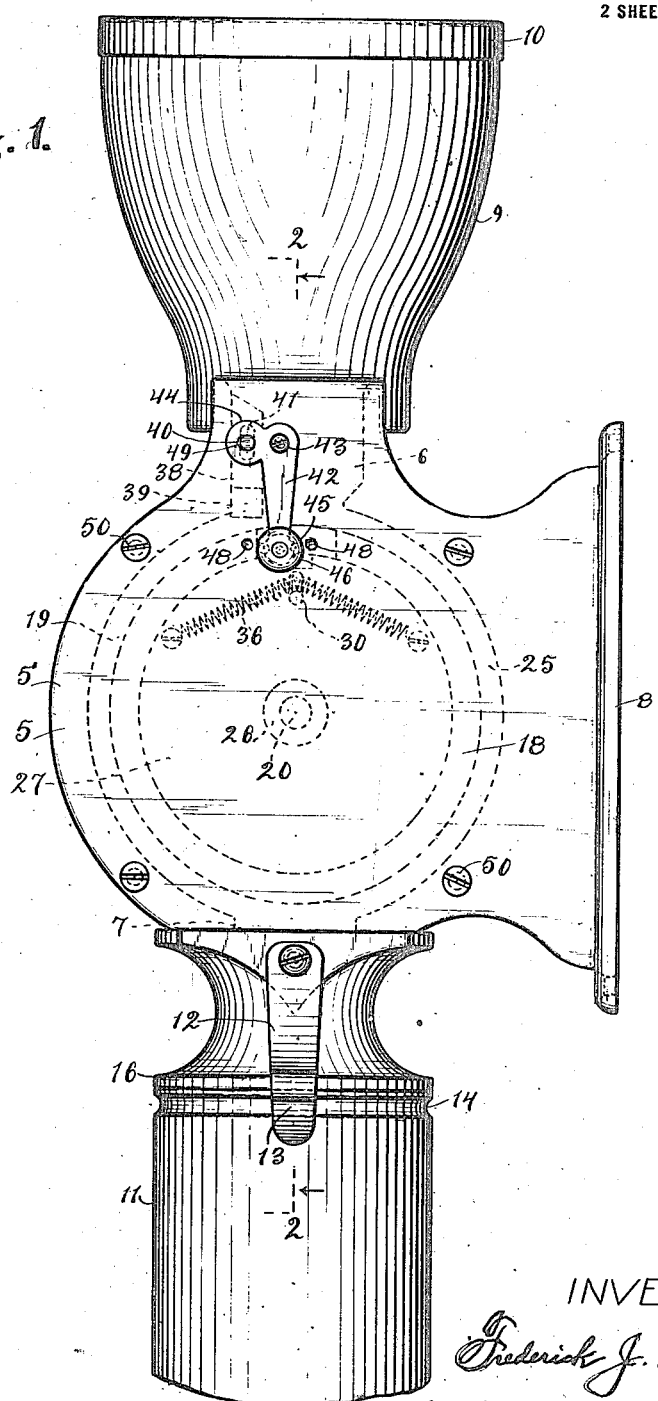
Figure 1 is a side view of the improved cutting mill, interior parts being indicated in dotted lines.

Referring to the drawings the numeral 5 indicates a casing of approximately circular form which is provided with an upper inlet opening 6, a lower outlet opening 7 and a projecting apertured attaching flange 8 for connecting the casing to a support. A hopper 9 having a cover 10 is mounted on the upper portion of the casing opens into the inlet opening 6 and a receptacle 11 removably connected to the outlet portion of the casing receives the comminuted substance which has been cut by the mill. The receiving receptacle is removably connected to the casing by opposite spring members 12 which are fastened at their upper ends to the casing and have lower curved shouldered portions 13 which snap into an annular groove or recess 14 formed around the upper end of the receptacle when said receptacle is pushed upwardly in position to surround the lower reduced end portion 15 of the casing and against the shoulder 16 of said casing.

The casing 5 is formed with a circular chamber 17 in which is positioned the rotary member 18 in the form of a fly wheel which is of less diameter than the diameter of the chamber and therefore provides an annular space 19 between the periphery of the rotary member and the inner circular surface of the casing for the passage of the comminuted substance therethrough. The rotary member is mounted fast on a drive shaft 20 which extends through the body portion 5' and which shaft preferably is an extension of the armature shaft 21 of an electric motor 22. The motor is mounted on stud bolts 23 projecting from the mill casing and receives its power through a plug connection 24 which may be easily attached to a socket of a source of electric current supply in the usual manner.

The rotary member is formed with a rim portion 25, a hub portion 26 and a connecting web 27 of less thickness than the rim portion. The rim portion is of a width to closely fit the space between the opposite side walls of the casing and at one point is provided with a transverse recess 28 which extends radially through the rim and is extended into the web in the form of a bore 29. The web portion is also provided with an elongated slot 30 which intersects the bore 29. For convenience of manufacture the recess 28 is cut transversely through the rim and the side portions are then closed by plates 31 which are recessed into the rim and riveted thereto.

A cutting member 32 having a series of outwardly extending cutting teeth 33 is reciprocally mounted in the transverse recess 28 and has an inwardly extending guide stem portion 34 which extends into the bore 29. A stop pin 35 extending through the transverse slot 30 and the guide stem 34 serves to limit the outward and inward movement of the cutting member by striking against the end walls of the slot 30. The cutting member is normally maintained in its innermost or inoperative position by a coiled spring 36 which is fastened at its opposite ends to the web of the rotary member by screws 37 and is looped medially over one end of the stop pin 35. When the rotary member is rotated at a speed of approximately six thousand revolutions per minute the centrifugal force imparted to the rotary cutting member will cause said member to overcome the tension of the spring and move outwardly to an operative or cutting position as indicated by dotted lines in Fig. 3 and by solid lines in Fig. 2. A stationary cutting member 38 adjustably mounted in the inlet opening 6 of the casing is formed with downwardly projecting cutting teeth 39 which co-act with the cutting teeth of the member 32 in reducing material passing through the mill. The said teeth 39 are staggered with relation to the teeth of the rotary cutting member so that the said teeth of the last mentioned member will pass between the teeth of the stationary member and form a shearing cut therebetween. The stationary cutting member snugly fits between the side walls of the casing and is provided with a transversely extending guide pin 40 which projects through elongated guide slots 41 formed in the opposite side walls of the casing. An adjusting bell crank lever 42 fulcrumed on one side of the casing by a screw 43 is provided with a short arm 44 which has a slotted engagement with one end portion of the transverse pin. The long arm 45 of said adjusting lever 42 is formed of flat spring like material and at its free end is provided with a handle 46 for convenience of operation and with an inwardly projecting rounded pin 47 which enters one of a series of recesses 48 to lock the arm in adjusted position. The elongated slot 49 of the short arm 44 extends at right angles to the elongated guide slots 41 to permit the said short arm to turn in an arc.

By adjusting the teeth of the stationary cutter member toward or away from the periphery of the rotary member the degree of fineness of the cutting of the material may be controlled, the closer the teeth of the stationary cutter are adjusted to the periphery of the rotary member the finer the cut of the material.

To permit convenient access to the interior portion of the casing one side portion 5' is removably connected to the main portion by screws 50.

In operation the coffee or other substance is placed in the hopper and current to the motor is then turned on. The rotary member will start to revolve and when the speed of rotation reaches the predetermined rate the rotary cutting member will be moved outwardly by centrifugal force to cutting position and will co-act with the stationary cutter in cutting the substance fed into the hopper. As the cutting operation will only take place when the rotary member is revolved at the predetermined rate it will be practically impossible to accidentally stop the cutting operation because if the speed of rotation of the rotary member should be diminished the rotary cutting member will be drawn inwardly by its spring and the cutting operation would temporarily cease until the speed of rotation had again increased to the desired extent. When the rotary cutting member is in its normal non-cutting position the periphery of the rotary member will present a smooth surface which will not be impeded to any appreciable extent by the weight of the material resting thereon and consequently a very small power is sufficient to start the rotary member without load and increase the speed to an extent sufficient to withstand the cutting impact which takes place once each revolution of the rotary member. The fly wheel construction of the rotary member also assists by its momentum in withstanding the cutting impact. By adjusting the position of the stationary cutter member the degree of fineness of the cut may be easily regulated.

From the foregoing description it will be seen that the cutting mill may be rotated with comparatively a small motor and that the material is cleanly cut and not crushed in the ordinary manner. It will be further-

What I claim as my invention is:

1. A cutting mill, comprising a support, a stationary cutting member mounted on the support, a rotary member mounted on the support, and a cutting member carried by the rotary member which co-acts with the stationary cutting member only when the rotary member is revolved at a predetermined rate of speed.

2. A cutting mill, comprising a casing, a stationary cutting member mounted in the casing, a rotary member mounted in the casing, and a cutting member carried by the rotary member which co-acts with the stationary cutting member only when the rotary member is revolved at a predetermined rate of speed.

3. A cutting mill, comprising a casing, a stationary cutting member mounted therein, and a rotary member journaled in the casing and having a cutting portion which is moved outwardly by centrifugal force to a position to co-act with the stationary cutting member when the rotary member is revolved at a predetermined rate of speed.

4. A cutting mill, comprising a casing, a stationary cutting member mounted in the casing and having downwardly extending teeth, a rotary member mounted in the casing, and a cutting member carried by the rotary member which co-acts with the stationary cutting member only when the rotary member is revolved at a predetermined rate of speed, said rotary cutting member having outwardly extending teeth which pass between the teeth of the stationary cutting member when co-acting therewith.

5. A cutting mill, comprising a casing having an inlet and an outlet opening, a stationary cutting member mounted in the inlet portion of the casing, a rotary member in the form of a fly wheel mounted in the casing and having its periphery adjacent the inlet opening, and a cutting member carried by the rotary member and co-acting with the stationary cutting member when the rotary member is revolved at a predetermined rate of speed.

6. A cutting mill, comprising a casing having an inlet and an outlet opening, a stationary cutting member mounted in the casing, a rotary member in the form of a fly wheel mounted in the casing and having its periphery adjacent the stationary cutting member, and a cutting member carried by the rotary member and having its cutting portion normally yieldingly maintained within the circumferential plane of movement of the periphery of the rotary member and movable by centrifugal force to project beyond said periphery and co-act with the stationary cutting member when the rotary member is rotated at a predetermined rate of speed.

7. A cutting mill, comprising a casing having an inlet and an outlet opening, a stationary cutting member mounted in the casing, a rotary member in the form of a fly wheel mounted in the casing and having its periphery adjacent the stationary cutting member and provided with a transverse recess in its rim portion, a cutting member slidably positioned in the recess and movable to an outer cutting position by centrifugal force when the rotary member is rotated at a predetermined rate of speed, and means for normally maintaining the movable cutting member in its inoperative inner position.

8. A cutting mill, comprising a casing having an inlet and an outlet opening, a stationary cutting member mounted in the casing, a rotary member in the form of a fly wheel mounted in the casing and having its periphery adjacent the stationary cutting member and provided with a transverse recess and a radial bore, a cutting member slidably positioned in the recess and having a stem portion which enters the bore, said cutting member being movable to a position to co-act with the stationary cutting member by centrifugal force, and a yielding means for normally maintaining the movable cutting member in its inoperative inner position.

9. A cutting mill, comprising a casing having an inlet and an outlet opening, a stationary cutting member mounted in the casing, a rotary member in the form of a fly wheel mounted in the casing and having its periphery adjacent the stationary cutting member and provided with a transverse recess and a radial bore, a cutting member slidably positioned in the recess and having a stem portion which enters the bore, said cutting member being movable to a position to co-act with the stationary cutting member by centrifugal force, and a coiled spring connected to the rotary member and to the movable cutting member for normally maintaining the movable cutting member in inoperative position.

10. A cutting mill, comprising a casing, a stationary cutting member mounted in the casing, a comparatively high speed motor mounted on the casing and having its shaft extending into the casing, a fly wheel mounted on the shaft and positioned within the casing, and means carried by the fly wheel and co-acting with the stationary cutting member for reducing material passing between the said stationary cutting member and the fly wheel when said fly wheel is rotated at comparatively a high rate of speed.

11. A cutting mill, comprising a casing, an adjustable cutting member mounted in the casing, a comparatively high speed electric motor connected to the casing and having its shaft extending into the casing, a fly wheel mounted on the shaft and positioned within the casing, and a movable cutting member carried by the fly wheel and movable to a position to co-act with the stationary cutting member to reduce material passing between the said stationary cutting member and the fly wheel when said fly wheel is rotated at a predetermined rate of speed.

12. A cutting mill, comprising a casing having a circular chamber and an upper inlet opening and a lower discharge opening, a stationary cutting member mounted in the chamber adjacent the inlet opening, a comparatively high speed electric motor connected to the casing and having its shaft extending into the chamber, a fly wheel mounted on the shaft and positioned within the chamber, said fly wheel being of less diameter than the chamber to form a passageway between the casing and the periphery of the fly wheel, and a movable cutting member carried by the fly wheel and movable to a position to co-act with the stationary cutting member to reduce material passing between the said stationary cutting member and the fly wheel when said fly wheel is rotated at a predetermined rate of speed.

13. A cutting mill, comprising a casing having a circular chamber and an upper inlet opening and a lower discharge opening, a stationary cutting member mounted in the chamber adjacent the inlet opening, a comparatively high speed electric motor connected to the casing and having its shaft extending into the chamber, a fly wheel mounted on the shaft and positioned within the chamber, said fly wheel being of less diameter than the chamber to form a passageway between the casing and the periphery of the fly wheel, a radially movable cutting member carried by the fly wheel and movable by centrifugal force to a position to co-act with the stationary cutting member to reduce material passing between the said stationary cutting member and the fly wheel when said fly wheel is rotated at a predetermined rate of speed, and means normally maintaining the movable cutting member in inoperative position.

14. A cutting mill, comprising a casing having a circular chamber and an upper inlet opening and a lower discharge opening, a stationary cutting member mounted in the chamber adjacent the inlet opening, a comparatively high speed electric motor connected to the casing and having its shaft extending into the chamber, a fly wheel mounted on the shaft and positioned within the chamber, said fly wheel being of less diameter than the chamber to form a passageway between the casing and the periphery of the fly wheel, a radially movable cutting member carried by the fly wheel and movable by centrifugal force to a position to co-act with the stationary cutting member to reduce material passing between the said stationary cutting member and the fly wheel when said fly wheel is rotated at a predetermined rate of speed, and a spring means for normally maintaining the movable cutting member in inoperative position.

15. A cutting mill, comprising a casing having a circular chamber and an upper inlet opening and a lower discharge opening, a receptacle removably connected to the casing to receive the material discharged through the discharge opening, a stationary cutting member mounted in the chamber adjacent the inlet opening and having downwardly extending teeth, a comparatively high speed electric motor connected to the casing and having its shaft extending into the chamber, a fly wheel mounted on the shaft and positioned within the chamber and having a transverse recess in its rim, said fly wheel being of less diameter than the chamber to form a passageway between the chamber and the periphery of the fly wheel, a movable cutting member slidably positioned in the transverse recess and having outwardly extending teeth which pass between the teeth of the stationary cutting member when moved outwardly by centrifugal force to reduce material passing between the said stationary cutting member and the fly wheel, and a yielding means normally maintaining the movable cutting member in an inoperative position.

In testimony whereof, I affix my signature.

FREDERICK J. OSIUS.